United States Patent Office 3,526,894
Patented Sept. 1, 1970

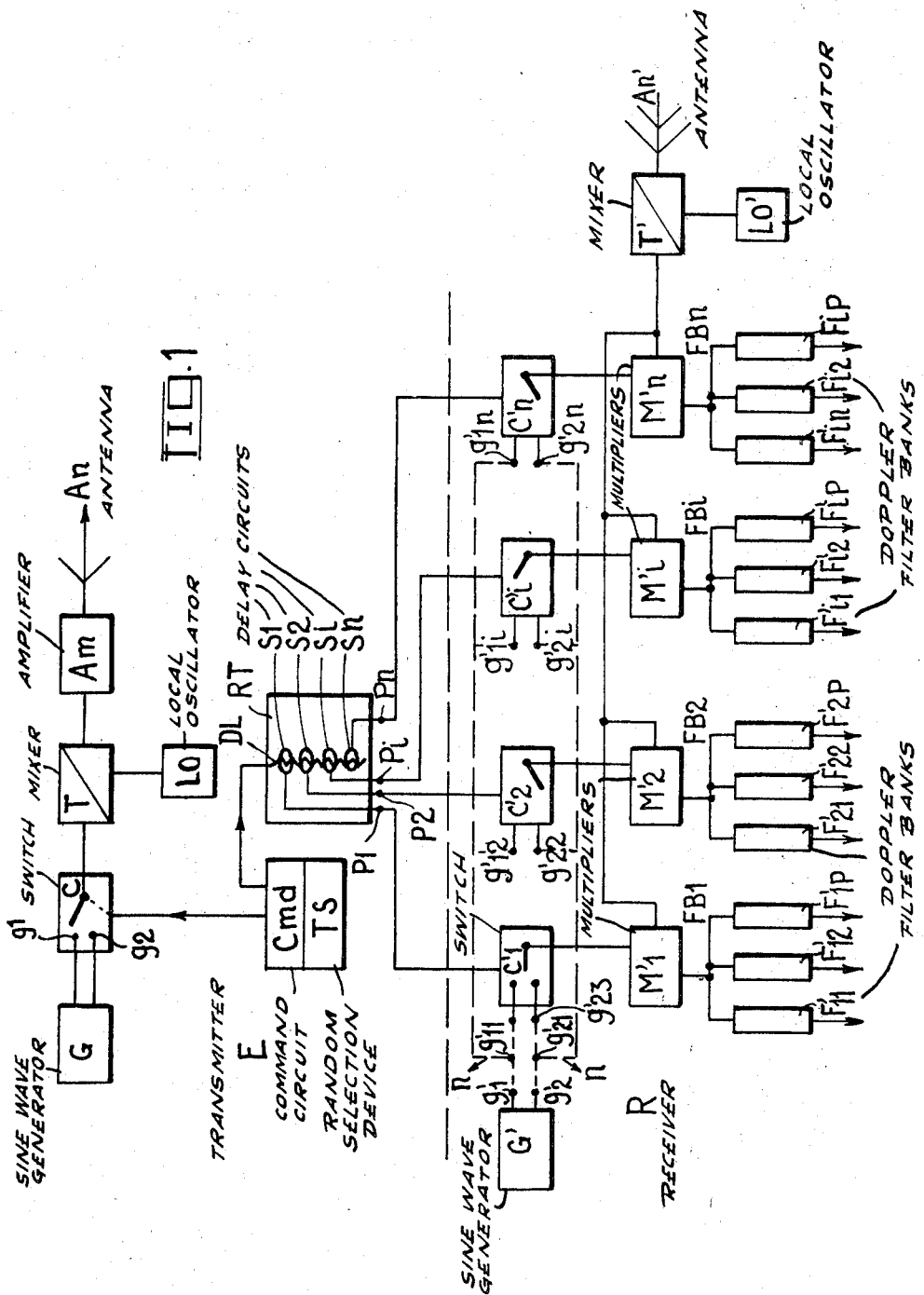

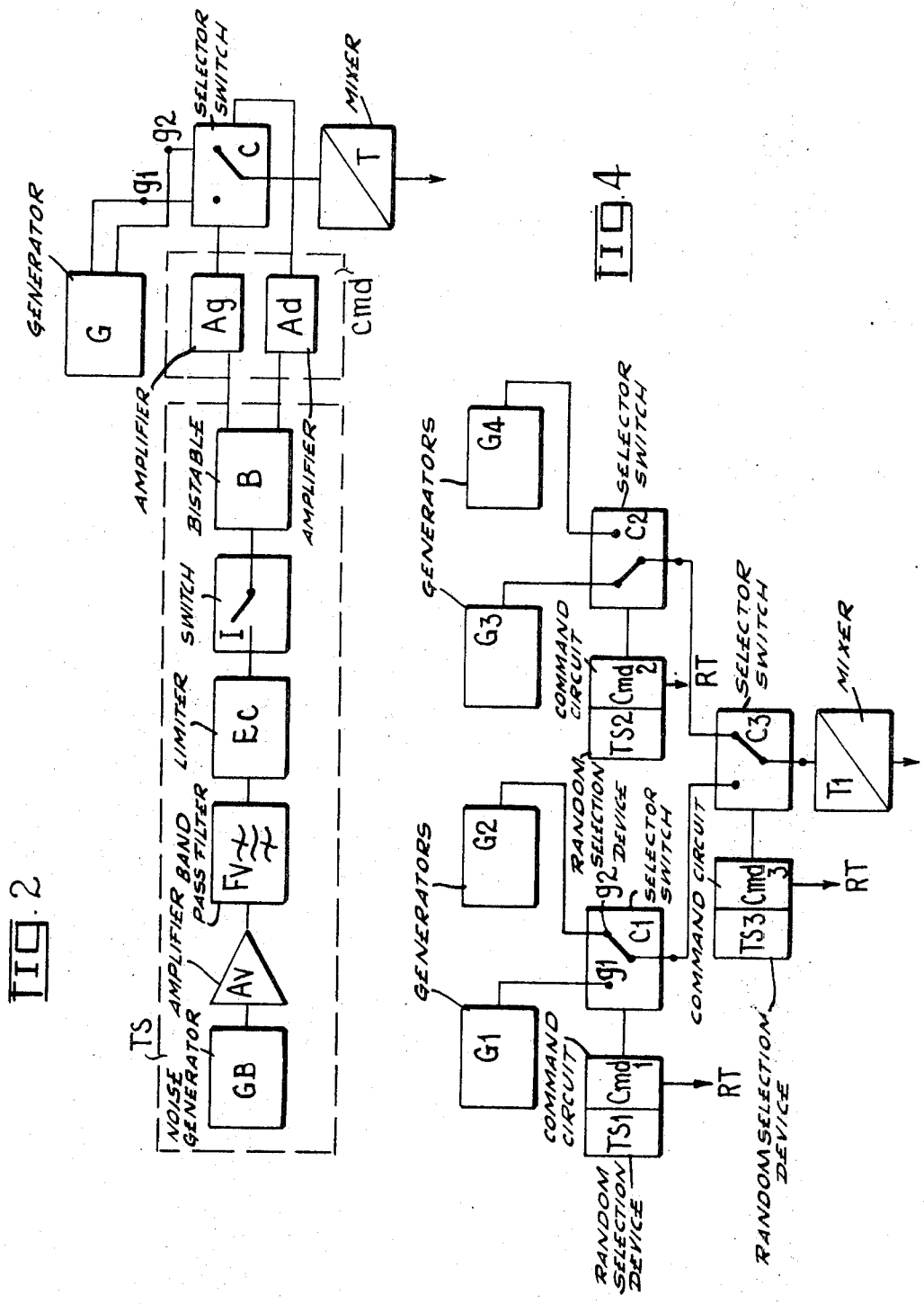

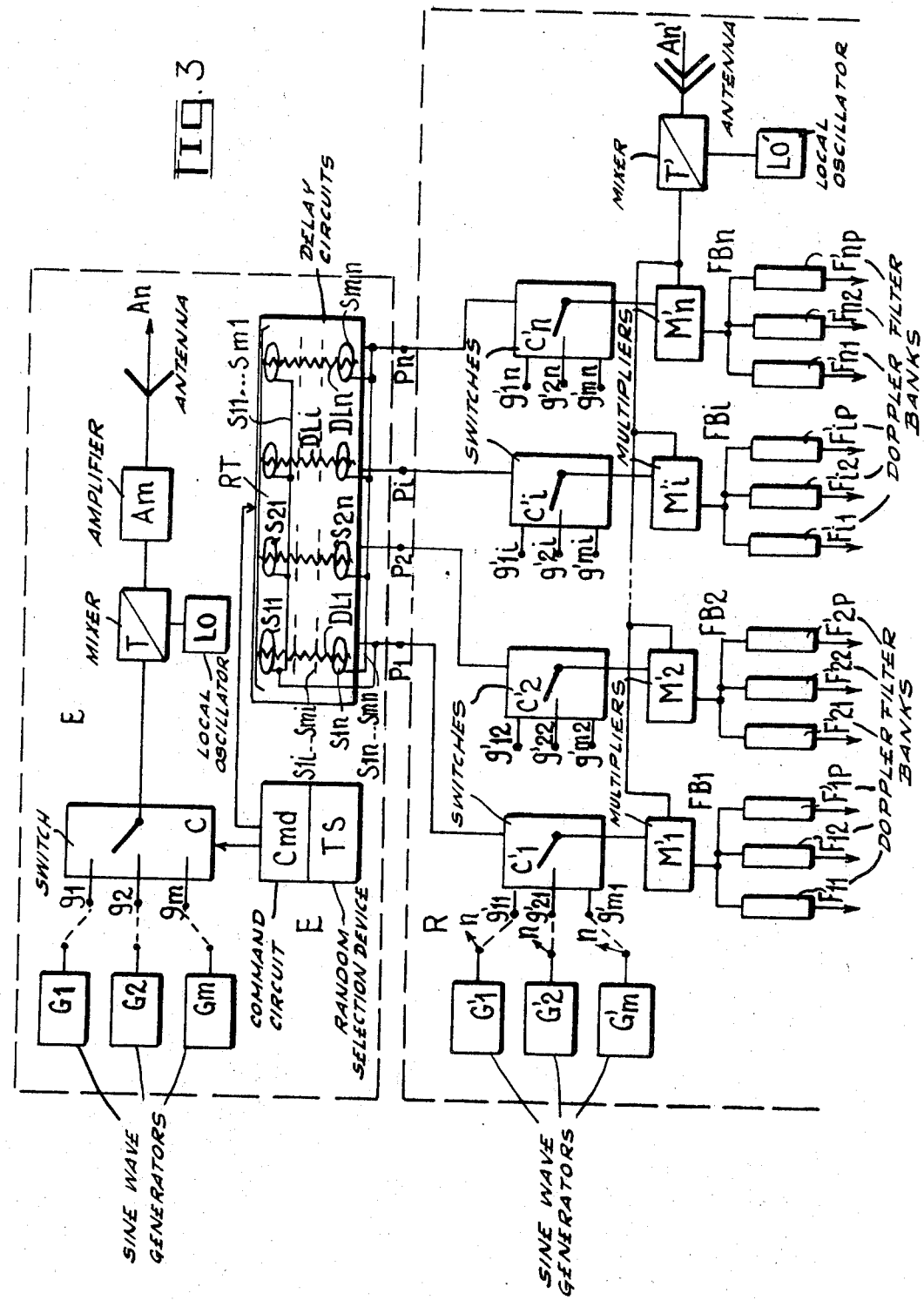

3,526,894
RANDOM MODULATION RADAR
Robert Guilhem, Sceaux, Eugène Desveaux, Fontenay-sous-Bois, and Georges Nard, Clamart, France, assignors to Compagnie Francaise Thomson-Houston-Hotchkiss Brandt, Paris, France, a corporation of France
Continuation-in-part of application Ser. No. 194,733, May 14, 1962. This application Sept. 27, 1965, Ser. No. 492,353
Claims priority, application France, May 18, 1961, 862,199
Int. Cl. G01s 9/44, 7/36
U.S. Cl. 343—9                    8 Claims This application is a continuation-in-part of application Ser. No. 194,733, Robert Guilhem, Eugène Desveaux and Georges Nard filed May 14, 1962 for Radio-Detection Methods, now abandoned.

The present invention concerns an improved radar system capable of greatly reducing the effects of the jamming and also of increasing the range of the equipment.

The invention is applicable both to continuous-wave and to pulsed radar systems and the term radar as used throughout the specification and claims is to be interpreted in its broadest acceptation as applying to all systems of these various characters.

Radar systems are known which by the use of an appropriate method are capable of detecting targets despite the jamming of the transmission while preserving themselves to be detected by an opponent operating a jammer.

The method referred to above consists in transmitting a radiowave, the instantaneous frequency of which is randomly varied. On transmission, the bandwidth of the transmitted signal is well determined and the energy of the signal is statistically evenly distributed in the band over a relatively long time while being varied at each instant. On reception, a correlation method is used which by the comparison of the received wave and the properly delayed transmitted wave derives indications relative to the targets. Naturally the delay sustained by the transmitted wave depends upon the range of the target from the radar equipment and this transmitted wave is given as many delays as there are ranges surveyed. Such an equipment operating in accordance with the above described method should comprise a number of delay lines which should have an operating frequency with a bandwidth as large as possible to enable the distance to the target to be accurately determined despite the jamming and should also be capable of producing large delays corresponding to long range equipment. Such delay lines are made of networks with lumped constant LC cells or coaxial lines of great length. The making of such delay lines, although possible is nevertheless difficult and certainly expensive.

The system according to the invention, obviates to the drawbacks brought in by such lines.

An object of the invention is the provision of a radar equipment operating with randomly variable frequencies or phases.

Another object of the invention is the provision of a radar equipment with a high distance resolution.

Another object of the invention is the provision, in the transmitter, of a number of different frequency voltages that are used to establish the carrier frequency of the transmitter, the selection of the different voltages being randomly made.

Another object of the invention is the provision in the receiver of a corresponding number of different frequency voltages that are used to demodulate the received signals, a correspondence being established between the selected voltages controlling the transmitter and the corresponding voltages used at the receiver.

According to a further object of the invention, the two corresponding voltages are chosen so as to differ in phase by an amount being a linear expression of a constant and a term proportional to the time and to the intermediate frequency.

According to a further object of the invention, the voltages which are randomly selectable at the transmitter are each used in a given time interval and changed with a periodicity equalling this time interval.

According to another object of the invention, the selection of a given voltage at the transmitter induces the selection of the corresponding voltage at the receiver.

According to another object of the invention, means are provided for obtaining at the passage from one voltage to another, the same phase difference both at the transmitter and at the receiver.

According to another object of the invention, means are provided in the radar transmitter to transform the transmitted radar signals either contonuous or pulse, in a series of successive adjacent elementary pulses, randomly changing frequency and phase angle, said elementary pulses being transmitted as short radar pulses.

According to a broad aspect of the invention, a set of generators is provided at the transmitter, generating each a periodic voltage of given frequency and phase used to establish the carrier frequency of the transmitted wave during predetermined time intervals. The duration of each of these intervals, say $\tau$, is chosen so as to correspond to the distance resolution of the radar equipment, i.e. the minimum distance between two points in the space, the radar is able to distinguish. Thus, every $\tau$ microseconds for instance the carrier frequency of the transmitter is established by the selection of a voltage of given frequency and phase and according to the invention, this carrier frequency is transmitted during $\tau$ microseconds. As already mentioned, the selection of the voltages is randomly made among a predetermined number of same.

On the reception and in order to have the correlation means operating with their optimum efficiency, the received or echo signal is multiplied with a periodic voltage corresponding to that used at the transmitter. Preferentially this correlation is made at intermediate frequency and obviously the frequency of the demodulating voltage or its phase angle takes allowance for the value of said intermediate frequency.

From the method hereinabove described, it appears that the random selection of a voltage at the transmitter induces a corresponding selection of a voltage called reference voltage at the receiver.

There is hardly to be said that the multiplication of the received signal by means of this voltage will be delayed a given amount of time corresponding to the travel duration of the transmitted wave to the target and back. In accordance with the surveyed distances, the receiver will comprise a corresponding number of correlators and associated circuits, each being assigned to a given distance. For so predetermined ranges, the correlators deliver voltages feeding each a filter bank wherein the number of filters may be great, such as one hundred. In each bank the bandwidth of each individual filter is wide enough to accept the signal energy but not so wide as to introduce more noise than need be. The center frequencies of the filters are staggered to cover the entire range of Doppler frequencies.

In order that the processing of the received signal may be effected in the best conditions, it is necessary that the phase shift or phase "jump" as a voltage is substituted for the other at the transmitter is the same at the receiver when passing from the corresponding reference voltage to the other. In this respect, the frequency difference between two successive voltages is bound up with the delay sustained by the reference voltages before its application to the corresponding correlator means, as set forth herebelow.

Assuming that $fi$ and $fj$ are the frequencies of the voltages as delivered by two generators provided for at the transmitter, these voltages being substituted for each other at a given instant and for a given time interval $\tau$ and assuming further that $\eta k$ is the travel time of the transmitted wave to the target at a distance $dk$ and back to the radar, the phase "jump" as above defined is the same at the transmitter and at the receiver if the following expression is satisfied: $(fi-fj)\eta k=C$, where C is an integer. This expression will be justified later on.

Besides, a general mathematical expression of the phase angles of the periodic voltages selected may be given, in the preferential case where the phase angles are contemplated.

A first voltage used to establish a first carrier frequency of the transmitter delivered by a first generator characterized by its frequency $fi$ and a constant phase shift has a phase angle denoted by $\Phi i=2\pi fit+\varphi i$. The corresponding reference voltage selected at the receiver may be given the expression:

$$\Phi'i=\Phi i+\Delta\Phi=\Phi i+2\pi Ft+\varphi'i$$

where F is the intermediate frequency of the receiver and $\varphi'i$ a constant phase shift also depending as $\varphi i$ above, on the generator itself. These constant phase shifts have no troublesome action on the operating conditions of the equipment. It is to be noted that in the expression of $\Phi'i$ allowance has been made for the intermediate frequency of the receiver.

It is obvious that the above expressions become simplified if, as it will be described in the following specification, only two voltages are contemplated differing from each other in their phase angles.

In the preamble of this specification, it has been stated that the invention was applicable to both continuous-wave and to pulsed radar systems.

The signal which in a C.W. radar system is continuously transmitted to the targets has, according to the invention, its carrier frequency varying every $\tau$ microseconds and the transmission of each successive carrier frequency lasts $\tau$ microseconds also. In the case of a pulsed radar system, the radar pulse is transmitted during a given amount of the repetition period and inside this pulse, in accordance with the invention, the carrier frequency is varied in the same conditions as in the C.W. radar system. The following numerical data are given as an example of such a pulsed radar operated according to the invention. The duration of the repetition period is 6 milliseconds, the duration of the radar pulse is 2 milliseconds and a so-called elementary pulse inside the radar pulse has a duration of $\tau=5$ microseconds. By this numerical example, it is easily seen that the distance resolution of the radar is greatly improved with respect to that of radars which do not apply the invention and this result need not be emphasized in greater detail.

Exemplary embodiments of the invention will now be described for purposes of illustration with reference to the accompanying drawings which:

FIG. 1 is a simplified block diagram of a radar system according to an embodiment of the invention utilizing two generators;

FIG. 2 shows a random selection device;

FIG. 3 is a simplified block diagram of a radar system similar to that of FIG. 1 but wherein several generators are contemplated, and FIG. 4 shows a random selection device usable for selecting a voltage among a plurality.

It will be noted that in the various figures, components performing the same functions are as far as possible designated by the same references.

The system of FIG. 1 shows under the form of a block diagram the necessary circuits to embody the invention claimed in the case where only two voltages are contemplated in the transmitting part. It will be noted that the description of the circuits will be voluntarily limited to those necessary to a clear understanding of the invention and that other devices, usually found in a radar equipment, but known by everyone skilled in the art, will not be described if no part of the inventive system.

According to the invention and by reference to FIG. 1, the transmitting part E includes a generator G, delivering two sine voltages of same frequency but differing from each other by their phase angle. Conveniently and for the sake of clarity, one of these voltages having a phase angle O appears at terminal $g1$ of generator G whereas the other voltage having a phase angle of $\pi$ appears at terminal $g2$. A selector switch C shown simply as a switch with a rotating arm, for instance, makes contact with either terminals $g1$ or $g2$ on a random fashion, under the control of circuits TS and Cmd, TS being a random selection device and Cmd the circuit which transmits the commands from device TS. Selector switch C is connected by its sole output with the mixing device T, being itself connected with local oscillator LO. The output of the mixer T feeds the transmitting antenna An through amplifier Am. The transmitter E, also includes, a delay device RT which is connected with circuit Cmd. This delay device RT is capable of producing delays of different values which it transmits to the receiver R. This delay device is advantageously made of magnetostrictive lines, which are easily operated to produce delays which correspond to the ranges surveyed by the radar equipment and which can be also easily changed relative to the changes made on the distances. In the present embodiment one delay line DL may be also used, with inductively coupled sense windings $Si$ located at suitable points thereof.

On the receiver side R, a generator G' corresponding to generator G produces at its outputs $g'1$ and $g'2$ two sine voltages differing from each other by the same phase angle as the corresponding voltages at the transmitter, viz, the "0" phase shift voltage appears at terminal $g'1$ whereas the "$\pi$" phase shift voltage appears at terminal $g'2$. These voltages are selectable by means of the rotating arm of selector-switches C', each identical with selector switch C in the transmitter E. Each of these selector-switches C'1 to C'n is connected with a tap of the delay device RT so as to have the same position as switch C with the exception that the operation of selector-switch C' is delayed by an amount proportional to the travel time of a wave to the target and back. These selector-switches C'1 to C'n are connected with correlators M'1 to M'n respectively, being each furthermore fed with the echo signal received by the receiving antenna A'n. As usual, this echo signal is heterodyned in the mixer T' with a local frequency delivered by the local oscillator LO', said mixer T' being similar to mixer T in the transmitter.

Each correlator is connected with a bank of filters and in each such bank, the filters have narrow contiguous or somewhat overlapping frequency bands whose central frequencies are uniformly displaced so that the whole series of said narrow overlapping bands covers the range of Doppler frequencies corresponding to the velocities that can be reasonably expected from a detected target. The respective outputs of these filter banks give an indication relative to the radial velocity of the targets that is exploited in a known manner upon which no comment is necessary.

The above described device operates as follows. In order to overcome the effects of jamming and also to have a better distance resolution, as it has been already mentioned, the control voltage of the transmitter E is changed every $\tau$ microseconds and replaced during $\tau$ microseconds by another voltage have another phase angle but the same frequency. As the generator G is designed to produce two voltages of frequency $f$ and opposite phase angles $\Phi1$ and Φ2, the selector-switch C has to select one of these voltages of phase angles which may be expressed as follows:

$$\Phi 1 = 2\pi f t + \varphi$$
$$\Phi 2 = 2\pi f t + \varphi + \pi$$

where $\varphi$ is a constant phase shift.

It is well understood that the selection of one of these voltages determines the selection of the reference voltage used for the processing of the received signal. The two voltages produced by generator G' at the receiver differ also of the phase angle $\pi$ from each other. It is also to be understood that, in accordance with the invention, the selection, at the transmitter, of the voltage of phase angle Φ1 allows, at the receiver, the selection of either the voltage of phase angle Φ'1 or the voltage of phase angle Φ'2 but that the further selection, at the transmitter of the voltage of phase angle Φ2 commands at the receiver the selection of voltages of phase angle Φ'2 or Φ'1. The inobservance of the above rule may lead to a loss of sensitivity of the radar equipment.

According to the invention, the selection of the voltages at terminals $g1$ or $g2$ of generator G is made at random by means of a simple randomly selection device TS.

Such a device is shown on FIG. 2 that will be now described which concern the selection of a voltage of a given phase angle among two being of the same frequency. A noise generator GB produces a voltage the video frequency components of which are amplified in amplifier Av.

Said voltage feeds in a band pass filter FV the pass band of which is about 1 to 2 mHz. and the output filtered voltage is clipped in a double limiter EC, the output of which applies to a switch I the interrupting rate of which is about $\tau$ microseconds and which closes its contact for about 0.10 microsecond. During its closure time, interruptor I transmits either positive or negative pulses in accordance with the polarity of the noise voltage applying to the input of limiter EC. These pulses control at the rate of $\tau$ microseconds a bistable B, the two outputs of which apply to amplifiers A$g$ and A$d$ respectively. These amplifiers A$g$ and A$d$ constitute the command circuit Cmd commanding the selector-switch C. As the case may be, then, the switch arm of C will make contact with either terminal $g1$ (0 phase shift) or $g2$ ($\pi$ phase shift). The so randomly selected voltage is then applied to the mixer T receiving from the local oscillator LO a fixed frequency. The mixing device T operates so as to sum up the said fixed frequency and the frequency of the voltage selected as above described establishing a new carrier frequency of the transmitter every $\tau$ microseconds.

The voltage delivered at the output of mixer T which feeds amplifier A$m$ is at the operative carrier frequency of the transmitter during the $\tau$ microseconds the antenna A$n$ transmits it. For the next $\tau$ microseconds the transmitted voltage will be at another carrier frequency, established as above explained.

The command circuit Cmd is also connected with the delay device RT. This device consists of either a number of delay lines corresponding each to the desired delays respectively or of one delay line of a magnetostrictive material, producing the desired delays at the outputs of sense windings S1 . . . S$n$ inductively coupled to the line at appropriate spots therealong. The outputs of said windings or the outputs of the individual lines used in the device RT are connected with taps or terminals P1 to P$n$ each one being relative to a given delay. These delays referenced by $\eta i$ are chosen proportional to the transit time of the transmitted wave to targets and back; consequently these delays are proportional to the distances $di$ whereat targets are searched for.

The voltages appearing at terminals P1 . . . P$n$ are delayed by $\eta 1$ . . . $\eta n$ respectively with respect to the voltages applied to the input of RT device and apply thereafter to the different selector-switches C'1 . . . C'$n$, the selector switch C'1 being controlled with respect to selector-switch C after the delay $\eta 1$, the selector-switch C2 after the delay $\eta 2$ and in the same manner, the selector-switch C'$n$ after the delay $\eta n$. As $\eta i = 2di/c$ where $c$ is the propagation velocity of the electromagnetic waves and $2di$ twice the distance to the target, it results that at the time $t$ where the receiver R receives the return signal from the detected target, the selector-switch C'$i$ is in the same position as was the selector-switch C at the time $$t - \frac{2di}{c}$$

that is that at this time $t$ the receiver detects the targets which, at the distance $di$ to the radar have been illuminated by the radio waves beamed at them at the time $$t - \frac{2di}{c}$$

By means of this delay device RT and the associated selector-switches C'$i$, a correspondence is established between the voltages selected at the transmitter and the voltages which are subsequently to be selected at the receiver to be mixed with the received signal as will be explained later on.

Indeed it is necessary to match with the voltage selected at the transmitter to establish the carrier frequency for $\tau$ microseconds a corresponding voltage of a given phase angle to serve as reference voltage for processing the received signals. This latter voltage has a phase angle differing from that of the transmitter by a determined phase shift taking into account the frequency shift sustained in the receiver by the received signal.

It results then from the foregoing concerning the randomly selector device TS, that in accordance with the sign of the signals delivered by said device TS, the command circuit Cmd controls both the selector-switch C and the selector-switches C'$i$, these latter after a delay $\eta i$, so that if, for instance, the selector-switch C closes its contact on terminal $g1$, the selector-switches C'$i$ will close their contacts on terminal $g'1$ or $g'2$ pursuant to the fact that the phase angle of the reference voltage is chosen to be O or $\pi$ in response to the phase angle O, for instance, of the corresponding voltage at the transmitter. Obviously, then if the selector-switch C closes its contact on terminal $g2$, where the selected voltage has a phase angle of $\pi$, the selector-switches C'$i$ will close their contacts on terminals $g'2i$ or $g'1i$ selecting the reference voltage having a phase angle of $\pi$ or O, as the case may be.

A reference voltage generated in generator G' is thus delivered at the output of each selector-switch C'$i$, delayed by a value depending on the targets surveyed ranges. This reference voltage is applied to a correlator M'$i$ which is associated with the selector-switch C'$i$. To the second input of the correlator M'$i$ is applied the echo signal from the target through the antenna A'$n$ and the mixer T' wherein it has been heterodyned with a voltage coming from the local oscillator LO'. The frequency of the received signal applying to the correlator differs from the transmitted carrier frequency by the intermediate frequency and the Doppler shift frequency due to the Doppler effect.

A correlator, say M'$i$, of a known type such as for instance a mixer, effects the multiplication of the two signals which are respectively applied to its inputs, i.e. the reference voltage signal and the echo signal.

The voltage of the echo signal, at intermediate frequency includes components relative to the echoes returned by the targets, at different ranges, say $d1$ . . . to $dn$ which were struck by the waves transmitted at $$\left(t - \frac{2d1}{c}\right) \cdots \left(t - \frac{2dn}{c}\right)$$

By multiplying these voltages, the correlators will deliver a resulting voltage having a frequency, difference of the frequencies of the input voltages respectively, that is the frequency of the generator G' equalling that of generator G by a constant, taking into account the frequency shift sustained in the mixer T and that of the frequency shift sustained in the receiver and the frequency of the received signal containing the Doppler shift frequency.

Pursuant to the range where the tracked targets have been detected, the component corresponding to this range appears at the output of the corresponding correlator. This component feeds then the associated filter bank, say FB$i$, whereby the radial velocities of the targets detected at the considered range, will be derived.

It may occur in some cases, that other correlators than the one that corresponds to the very range where the target is searched, deliver a voltage to their associated filter banks. The likelihood that, under these conditions, an erroneous information is delivered by the concerned filter bank is small, because pursuant to the phase change made at the transmitter, there is little chance the multiplicaton of such signals be made with reference signals having the proper phase angle relationship with that of the received signal, as explained hereinabove. Then, the phase angles of the signals transmitted to the filters associated with the correlator operating at a false distance, frequently varies resulting in an output level, so small as compared with that of filters operating on the true range, that this low level output is rejected, by all known means, as a false indication.

The foregoing description has been made by reference to a very simple realization example, wherein there was no selection of a frequency to be made among several and hence no particular condition to be followed at the passage of one frequency to the next, as is the case where several frequencies are contemplated.

This condition will be evoked in the disclosure of an embodiment of the invention which follows, by reference to FIG. 3, wherein at the transmitter, a plurality of generators G are represented. Whereas the FIG. 3 shows only three generators, it may be easily extended to a plurality of same. It will be also noticed that, on this figure, the same references have been used as on FIG. 1 for circuits having identical functions.

In the embodiment disclosed on FIG. 3, the transmitter E includes a number of generators G1 . . . G$m$, each delivering a periodical voltage of given frequency and phase angle. Each such generator is connected with a terminal $g1$ . . . $gm$ of a selector-switch C, the rotating arm of which will come into contact of one of these terminals according to a command transmitted by the TS and C$md$ assembly. As already mentioned TS is a random selector device and C$md$, the associated command circuit. The selector-switch C having as many terminals as there are generators G, has its single output connected with the mixer device T, itself connected with the transmitting antenna A$n$ through the amplifier A$m$. The TS and C$md$ assembly which controls the selector-switch C, controls also the corresponding selector-switches C'$i$ at the receiver R, through the delay device RT. This device RT comprises for instance, as many delay lines as there are frequencies at the transmitter. These lines referenced on the figure by DL1 . . . DL$m$ are, preferentially made of a magnetostrictive material and comprise inductively coupled sense windings S11 . . . S1$m$, S21 . . . S2m, S$n$1 . . . S$nm$ at various places along the lines, each winding being characterized by a given delay $\eta1$ . . . $\eta m$, corresponding as previously mentioned to predetermined surveyed distances by the radar equipment. All the windings corresponding to a same delay are connected to a terminal of the RT device, say P1 for the windings S11 . . . S$n$1, PP2 for windings P21 . . . P$n$2 etc. . . . according to the number surveyed ranges. The receiver part R broadly includes the same circuits as already described by reference to FIG. 1.

A number of selector-switches C'$i$ are provided, having each an input connected to an associated terminal of the delay device RT. Briefly, selector-switch C'1 connects with terminal P1, selector-switch C'2 with terminal P2, selector-switch C'$n$ with terminal P$n$. In addition to that input, each selector-switch C'$i$ comprises as many additional inputs, as there are generators G'$i$. Indeed according to the invention, a generator G' at the receiver corresponds to a generator G, at the transmitter. Under these conditions, any generator G' is liable to be connected, if selected, with the different selector-switches C'$i$ which transmit the required reference voltage.

Each selector-switch C'$i$ has a single output connected with the input of a corresponding correlator M'$i$, receiving on its second input the echo signal received on the antenna A'$n$, and heterodyned in the mixer T', connected with the local oscillator LO'. Besides, each correlator has its output connected with a filter bank FB$i$ for the determination of a target according to its radial velocity.

The operation of the above described assembly is the following, which does not differ a lot from that of FIG. 1.

In accordance with the invention, every $\tau$ microseconds for instance, this time corresponding to the distance resolution of the radar equipment, the selection of a generator G1 . . . G$m$ is made, by means of the random selection device TS. In other terms, when a generator has been selected, it operates during $\tau$ microseconds and is substituted after this time by another.

A random selection device, shown FIG. 2 has been disclosed which could select at random between two generaors. In order to select between a plurality of generators, several devices like TS may be used and FIG. 4 shows how the devices are operating but it should well be understood that this description does not preclude the use of other random selection device if wanted.

The device TS1 commands, through command circuit C$md$1, the selector-switch C1, selecting randomly between generator G1 and G2; the device TS2 commands, through command circuit C$md$2, the selector-switch C2, selecting randomly between generators G3 and G4 etc. . . . The device TS3 commands through command circuit C$md$3, the selector-switch C3 which selects randomly between the two generators, previously selected by selector-switches C1 and C2. It is obvious that, by applying the above procedure, a random selection of one generator among a plurality may be made. The last selector-swttch C$i$ involved will then be able to transmit to the mixer T the selected voltage enabling the establishment of the transmitter carrier frequency for $\tau$ microseconds and by reference to FIG. 4, the generator G3 is the one selected.

It is also to be noted that all the command circuits C$md$1, C$md$2 and C$md$3 are connected with the delay device RT, comprising as many delay lines as there are elector-switches C required to achieve the selection.

At it has been above mentioned, the delay device RT comprises by reference to FIG. 3, as may delay lines as there are generators at the transmitter, said lines producing voltages delayed by amounts proportional to the travel time of the transmitted wave to the targets and back, thence corresponding also to the surveyed distances. Each selector-switch C'$i$ receives at the time $t$ an indication relative to the time at which the selector switch at the transmitter, was transmitting to the targets and this time is determined by the delay delivered by the delay device RT.

Then, according to the delays $\eta i$ produced in delay device RT, said delays $\eta i$ equalling a distance $2di/c$, one selector-switch at least enables the receiver R to deal with an echo signal coming from a target at a range $di$, said target being illuminated by a wave beamed at it at the time $$t - \frac{2di}{c}$$

This indication supplied to the receiver selector-switches by the transmitter, allows the selection of a corresponding generator G' by said selector-switches and for the surveyed range. Indeed, in accordance with the invention, it is obvious that the selection of a generator at the transmitter assigns the selection at the receiver of a corresponding generator G' and the voltage of said generator differs from that of the generator G at the transmitter by a given phase shift expressed as: $\Delta\Phi+2\pi Ft$. where $\Delta\Phi$ is a constant phase shift and F is the intermediate frequency and this whole phase shift, exactly allows the processing of the received echo signal to be achieved in the best conditions. It will be noted that the corresponding generators G and G' have not the same frequency. The existing frequency difference is not detrimental to the operation of the system, since it simply results of the fact that the frequency of generator G' allows for the frequency shift sustained in the receiver by the echo signal.

Then for a given voltage each selector switch C'i, for a predetermined distance di connects a generator G' with a correlator M'i receiving the suitable reference voltage on a first input. On a second input, the correlator M'i receives the echo signal after heterodyning in mixer T'.

The considered correlator M'i achieves the multiplication of the two voltages applied to it and delivers, for the surveyed range, the Doppler frequency shift depending on the radial velocity of the tracked target. This voltage component is applied to an associated Doppler filter bank FBi comprising several filter F'ii, which derives for the considered range, an indication relative to the radial velocity of the target.

In order that the equipment which has just been described operates satisfactorily, it is necessary that the same phase "jump" when passing at the transmitter from a first voltage at frequency $f1$ to a second voltage at frequency $f2$ be the same when, passing at the receiver from the first corresponding reference voltage at frequency $f'1$ to the second corresponding reference voltage at frequency $f'2$.

The exact correspondence between the phase shifts of the voltages is expressed by a formula binding up the frequencies used at the transmission and the delay corresponding to the surveyed distances. If it is assumed that $fi$ and $fj$ are the frequencies of two successively selected voltages and $\eta k$ the delay corresponding to the distance $dk$ surveyed, the formula is $(fi-fj)\eta k=C$, where C is an integer. Such a formula is easily justified as set forth below. The voltage delivered by generator Gi is $2\pi fit+\varphi i$ where $fi$ is the frequency and $\varphi i$ a constant phase shift and the voltage delivered by generator Gj is $2\pi fjt+\varphi j$ where $fj$ is the frequency and $\varphi j$ a constant phase shift. This latter voltage is to be substituted for the former at time $te$. The phase shift at the time of the substitution is:

$$\Delta\Phi=2\pi fjte+\varphi j-2\pi fite-\varphi i$$
$$=2\pi te(fj-fi)+\varphi j-\varphi i$$

At the receiver, the time of substitution of the corresponding reference voltages is $te+\eta k$ and the corresponding phase "shift" is $\Delta\Phi'$ which may be expressed as follows:

$$\Delta\Phi'=2\pi fj(te+\eta k)+\varphi j+2\pi F(te+\eta k)$$
$$-2\pi fi(te+\eta k)-\varphi j-2\pi F(te+\eta k)$$

where F is the intermediate frequency $$\Delta\Phi'=2\pi(fj-fi)te+\varphi j-\varphi i+2\pi(fj-fi)\eta k$$
$$=\Delta\Phi+2\pi(fj-fi)\eta k$$

It results therefrom that any voltages may be successively used to form on the one hand, the transmitter carrier frequency and on the other hand, the suitable reference voltages at the receiver, provided the above formula is satisfied. It results also therefrom, that, provided the frequencies of the generators satisfy the above relation, the random selection of the successively active generators may be made according to the invention.

It has been assumed in the above disclosure that the selection of the voltages needed to form the transmitter carrier frequency and hence the reference voltages was made at random. A selection according to a predetermined program established by any means, lies obviously within the scope of the invention.

Various other modifications will occur to those skilled in the art of radar or being made familiar with the present disclosure, both as concerns the details of the radar apparatus to which the invention is applied and the voltage selection devices used according to the invention.

What we claim is:

1. In a radar system of the type which includes transmitting means to transmit radar signals toward targets and receiving means to receive signals returned by said targets responsive to signals beamed thereat, the combination comprising:

means to select at regular intervals and at random, the phase angle of the transmitted radar signals so as to transmit as radar pulses a series of successive adjacent short pulses of the same duration but of different phase angles changing from one pulse to the next one or not at random, said means to select comprising at the transmitter a generator generating at least two periodic voltages of the same frequency but differing from each other by a fixed phase angle;

first selector switch means;

random selection means to operate said first selector switch means, said first switch means selecting at random under the control of said random selection means between said voltages and applying the selected voltage to said transmitting means wherein the carrier frequency of the transmitter is established as a series of short radar pulses with a phase angle changing from one to the next or not at random;

means at the receiver to receive the echo pulses returned by the targets, said means including a generator generating at least two periodic voltages of the same frequency but differing from each other by a fixed phase angle related to the phase angle between the voltages generated by said generator at the transmitter;

and second selector switch means controlled by said random selection means to select between said voltages whereby a correspondence is established between the voltages at the transmitter and those at the receiver.

2. The combination defined by claim 1 further including delay means to delay the control of said second selector switch means at the receiver by said random selection means, said delay being proportional to the ranges surveyed by said system.

3. The combination defined by claim 2 and further including means for each surveyed range to multiply the voltage selected by said second selector switch means corresponding to the voltage selected at the transmitter and serving as a reference voltage with the voltage of the echo pulses returned by the targets.

4. The combination defined by claim 3 and further including Doppler filter banks connected with said multiplying means to deliver output signals indicative of the velocity of said targets for the surveyed range.

5. In a radar system of the type which includes transmitting means to transmit radar signals toward targets and receiving means to receive signals returned by said targets responsive to signals beamed thereat, the combination comprising:

means to select at regular intervals and at random, the frequency and phase angle of the transmitted radar signals so as to transmit as radar pulses a series of successive adjacent short pulses of the same duration but of different phase angles and frequency changing from one pulse to the next one or not at random, said means to select comprising at the transmitter a first plurality of generators, each generating periodic voltages of different frequency and phase angle;
first selector switch means;
random selection means to operate said first selector switch means, said first switch means selecting at random under the control of said random selection means between said voltages and applying the selected voltage to said transmitting means wherein the carrier frequency of the transmitter is established as a series of short radar pulses of different frequency and phase angle changing from one to the next or not at random;
means at the receiver to receive the echo pulses returned by the targets, said means including a second plurality of generators generating periodic voltages of different frequency and phase angle related to the frequency and phase angle between the voltages generated by said first plurality of generators at the transmitter;
and second selector switch means controlled by said random selector means to select between said voltages whereby a correspondence is established between the voltages at the transmitter and those at the receiver.

6. The combination defined by claim 5 further including delay means to delay the control of said second selector switch means at the receiver by said random selection means, said delay being proportional to the ranges surveyed by said system.

7. The combination defined by claim 6 and further including means for each surveyed range to multiply the voltage selected by said second selector switch means corresponding to the voltage selected at the transmitter and serving as a reference voltage with the voltage of the echo pulses returned by the targets.

8. The combination defined by claim 7 and further including Doppler filter banks connected with said multiplying means to deliver output signals indicative of the velocity of said targets for the surveyed range.

References Cited

UNITED STATES PATENTS

| | | | |
|---|---|---|---|
| 3,110,897 | 11/1963 | Laurent | 343—13 |
| 3,163,862 | 12/1964 | Jenny | 343—17.1 |
| 3,188,635 | 6/1965 | Blythe | 343—14 |
| 3,212,087 | 10/1965 | Blass et al. | 343—17.2 |
| 3,216,010 | 11/1965 | Rosechke | 343—12 |
| 3,332,077 | 7/1967 | Nard et al. | 343—17.2 |
| 3,396,392 | 8/1968 | Fishbein et al. | 343—17.2 X |

RODNEY D. BENNETT, JR., Primary Examiner

T. H. TUBBESING, Assistant Examiner

U.S. Cl. X.R.

343—13, 17.2